United States Patent Office 3,318,820
Patented May 9, 1967

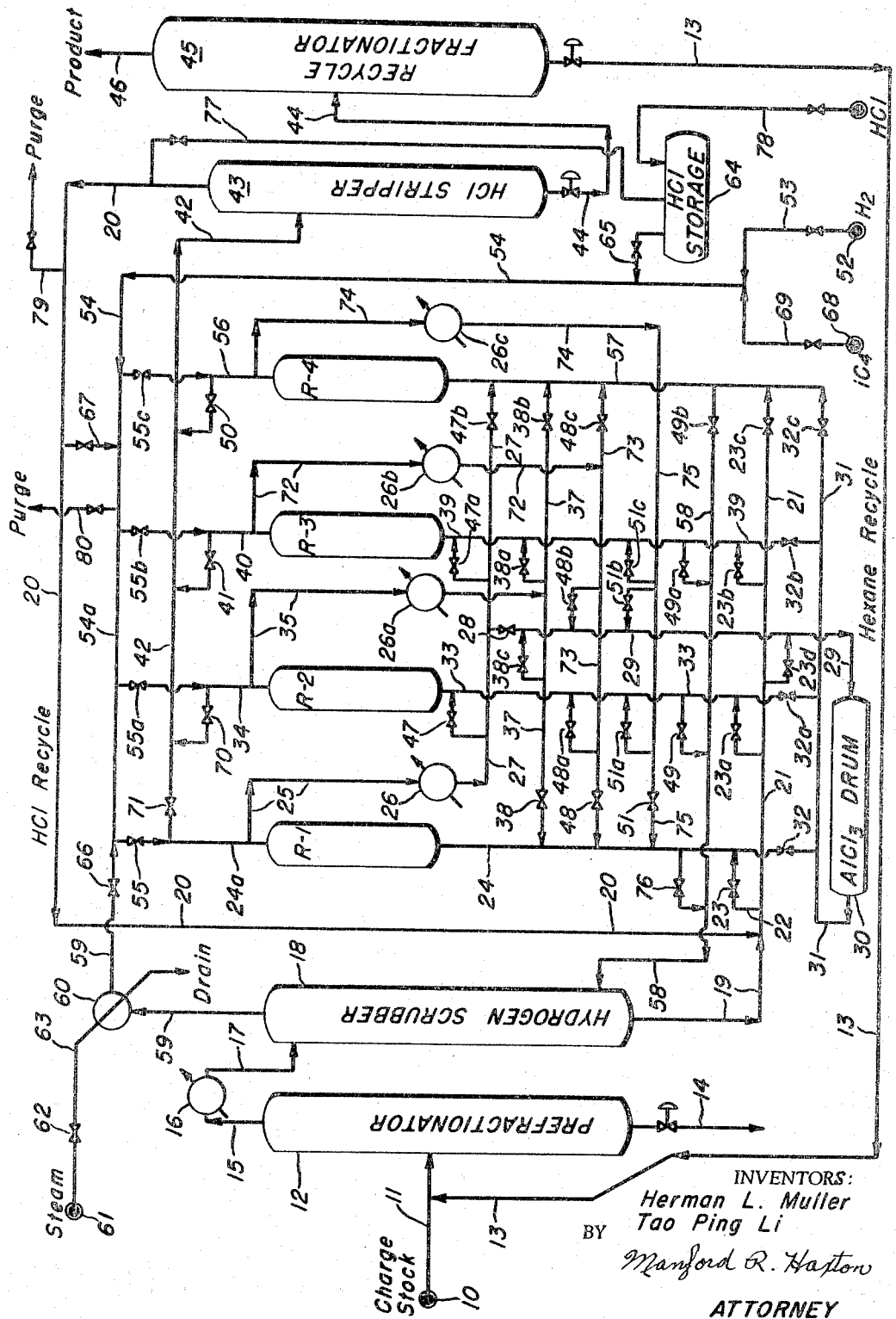

3,318,820
REGENERATION OF ALUMINUM HALIDE-ADSORBENT SOLID CATALYST
Herman L. Muller, Valparaiso, Ind., and Tao Ping Li, Park Forest, Ill., assignors to Standard Oil Company, Chicago, Ill., a corporation of Indiana
Filed June 30, 1964, Ser. No. 379,144
6 Claims. (Cl. 252—415)

This invention relates to methods for regenerating solid aluminum halide-adsorbent solid hydrocarbon conversion catalysts. More particularly, this invention relates to improved procedures for regenerating a used hydrocarbon conversion catalyst consisting essentially of the reaction product of aluminum halide and hydroxyl groups of surface-hydroxyl-containing adsorbent solid.

Used catalyst is defined as one possessing less catalytic activity than fresh catalyst of this type, which loss in activity has resulting form use in a conversion process involving a hydrocarbon feed. The used catalyst may be derived from any of the processes involving a hydrocarbon feed which are catalyzed by aluminum halides and, particularly, by solid catalysts of the type hereinafter defined. The used catalyst from conversions involving saturated hydrocarbons is particularly amenable to the regeneration process of the invention. A preferred source of used catalyst is that from the isomerization of lower molecular weight paraffins and cycloparaffins, namely, paraffinic hydrocarbons containing from 4 to 8 carbon atoms, which can be rearranged, and cycloparaffins containing from 6 to 9 carbon atoms, which can be rearranged. Some isomerization processes require the presence of a cycloparaffin inhibitor, in which case the hydrocarbon feed may contain not only the defined lower molecular weight paraffins but also cycloparaffins containing from 5 to 9 carbon atoms. Used catalyst from isomerization of n-butane, n-pentane, and n-hexane is a preferred source of catalyst to the regeneration process.

It is to be understood that the regeneration process of the invention is applicable to catalysts of the defined type which have lost some degree of catalytic activity and the regeneration may be only a partial restoration of this lost activity. The point at which a catalyst is considered to be "used" is not only a matter of ability to catalyze the reaction but also a matter of economics. It may be desirable to regenerate a fairly active catalyst back to essentially fresh catalyst activity rather than permit the catalyst to pass to a much lower level of activity and regenerate to a less than fresh activity. Also, it is to be understood some used catalyst may not be able to be returned to full activity; the nature of the process, the nature of the halide, the nature of the surface-hydroxyl-containing adsorbent solid, all these have a bearing on the ability of the used catalyst to be regenerated.

Used catalyst of this type can be regenerated to possess a substantially greater activity than the used catalyst by treatment with hydrogen gas at a temperature from about 100° F. to about 400° F., and a hydrogen partial pressure of from about 50 p.s.i. to about 2500 p.s.i., for a time sufficient to obtain the desired degree of activity increase. The hydrogen gas may include a hydrogen halide corresponding to the halide present in the used catalyst. The hydrogen treated catalyst is then treated with gaseous HCl at elevated temperature and pressure.

It has now been discovered that a more effective regeneration of the used catalyst resulting in even higher hydrocarbon conversion activity is achieved when the used catalyst is treated according to the present invention. According to our invention a used hydrocarbon conversion catalyst consisting essentially of aluminum halide reacted with hydroxyl groups of surface-hydroxyl-containing adsorbent solid is regenerated to provide a regenerated catalyst having substantially greater hydrocarbon conversion activity than the used catalyst by removing hydrocarbon which boils at a higher temperature than does butane substantially completely from said used catalyst, treating catalyst with hydrogen gas at a temperature of from about 100 to about 400° F. and a pressure of from about 50 to about 2500 p.s.i. for a time of about 1 to about 100 hours, removing volatile hydrocarbon from the hydrogen-treated catalyst, suitably by purging with a gas inert to the catalyst and such as nitrogen or hydrogen, or with HCl gas, and then treating the catalyst freed of volatile hydrocarbons with gaseous HCl at a temperature in the range of from about 0 to about 200° F. The HCl treating time is suitably 1 to 100 hours, preferably 2 to 50 hours, optimally 5–25 hours. The catalyst is then again employed for hydrocarbon conversion such as paraffin isomerization.

A method of regenerating a used paraffin isomerization catalyst according to this invention, which catalyst consists essentially of the reaction product of aluminum chloride and hydroxyl groups of surface-hydroxyl-containing adsorbent solid, to provide a regenerated catalyst having substantially greater catalytic activity for isomerization than the used catalyst comprises the steps of (1) removing hydrocarbon boiling above butane from the catalyst by purging the catalyst with a gas inert thereto, (2) treating the catalyst from step (1) with hydrogen gas containing 0 to 5 mol percent of HCl at elevated temperature and pressure, i.e. at a temperature above about 75° F. to about 400° F., and a pressure above atmospheric to about 2,500 pounds per square inch (p.s.i.), for a time of at least about one hour up to about 200 hours, (3) purging the catalyst with clean hydrogen or gaseous HCl to remove volatile hydrocarbon therefrom, and (4) treating the catalyst from step (3) with HCl gas at elevated pressure and temperature, such as 15–500 p.s.i. and 0 to about 200° F., for a time of about 1 to about 100 hours.

The preferred catalyst for use in our process, broadly considered, is an aluminum halide positioned on surface-hydroxyl-containing adsorbent solid and associated with hydrogen halide. It is preferred that the hydrogen halide correspond to the particular aluminum halide used. Aluminum chloride is the preferred aluminum halide and will be used in the subsequent discussion for the purpose of illustration. More specifically, the preferred catalyst is the reaction product of aluminum chloride with surface hydroxyl groups of surface-hydroxyl-containing adsorbent solid associated with hydrogen chloride.

The term "surface-hydroxyl-containing adsorbent solid" includes the various forms of silica gel and the various alumina materials, natural and synthetic, which have a substantial portion of the surface existing in the hydroxyl form, as opposed to the "dehydrated" oxide form. No adsorbed water, as such, should be present. Aluminas which can be treated to produce the required surface hydroxyl groups are gamma, eta, and chi forms of alumina. The surface-hydroxyl-containing adsorbent solids are not significantly active for hydrocarbon isomerization, under the other conditions of the process, nor is the aluminum chloride reaction product alone significantly active; yet, the reaction product, when conjoined with HCl produces more hydrocarbon conversion than do the same amounts of aluminum chloride and HCl alone, or surface-hydroxyl-containing adsorbent solid either alone or with HCl, under the other conditions of the process.

Aluminum chloride can exist on the surface of alumina in three forms: reacted with surface hydroxyl groups to form —O—$AlCl_2$ groups, chemisorbed $AlCl_3$ monomer, and as physically adsorbed aluminum chloride. In the case of silica gel, aluminum chloride can exist on the surface in only two forms: reacted with surface hydroxyl groups to form —O—AlCl₂ groups, and physically adsorbed aluminum chloride. The reacted and chemisorbed forms associate with HCl and thus form an active catalyst species; however, the chemisorbed monomer form is unstable and the aluminum chloride in this form tends to be desorbed by process and/or regeneration fluids, thus destroying this catalyst species. This species can be maintained or replaced, however, by replacing the aluminum chloride, e.g. in solution in the process stream. On the other hand, the reacted form is quite stable and, for example, the —O—AlCl₂ groups are not destroyed by atmospheric pressure inert gas purge at temperatures as high as 700° F., far above the sublimation temperature of aluminum chloride. The physically adsorbed form is even more unstable than the chemisorbed monomer form and is not a practical catalyst component.

The surface-hydroxyl-containing adsorbent solid should have a substantial amount of surface area. Only those pores in the absorbent solid having diameters greater than about 35 Angstrom units (35 A.) are utilized in forming the catalyst, therefore it is the surface area of the pores larger than about 35 A. which is important. The surface of adsorbent solid pores having diameters greater than about 35 A. is termed herein "effective surface" and the term "effective surface area" is used herein to mean the total surface area of an adsorbent solid minus the surface area attributable to surface within pores having diameters less than about 35 A. The surface areas and pore diameters herein are those which are determined by nitrogen adsorption techniques. It is desirable that the surface-hydroxyl-containing adsorbent solid have an effective surface area in the range of about 25–700 square meters per gram (sq. m./gm.), preferably 50–500 sq. m./gm.

The bauxitic materials which are naturally occurring impure alumina hydrates, such as bauxite and laterite, are a suitable source of surface-hydroxyl-containing adsorbent solids. The aluminous materials which contain substantial amounts, or even large amounts, of oxides other than aluminum oxide are suitable for use in preparing surface-hydroxyl-containing adsorbent to be conjoined with aluminum chloride and HCl. The synthetic material known as silica-alumina, which is used as a hydrocarbon cracking catalyst, is such a suitable aluminous material.

It is preferred to use alumina materials, synthetic or naturally-occurring, such as bauxite, as the surface-hydroxyl-containing adsorbent solid for preparation of the catalyst. Any adsorbed molecular water should be removed from the solid prior to contacting it with aluminum halide, lest the effectiveness of some of the aluminum chloride to form a catalyst be destroyed by reaction or hydration with the water. Adsorbed water can be removed by drying or calcining the solid; however, if calcination is used it should not be carried out under conditions of temperature and time so severe as to destroy the surface hydroxyl groups.

A convenient method of ascertaining whether adsorbed water is absent and an effective amount of surface hydroxyl groups is present in a particular adsorbent solid to be used in preparing catalyst is to determine the weight loss of the defined solid upon heating to about 1832° F. This weight loss is termed "loss on ignition" (LOI). It has been found that satisfactory surface-hydroxyl-containing adsorbent solids are those which contain little or no adsorbed molecular water and which lose about 2–10 weight percent, preferably about 4–8 weight percent in the case of the aluminas and 2–6 weight percent in the case of silica gel, of their original weight upon being heated to about 1832° F. The weight loss in these ranges is due, almost entirely, to the destruction of surface hydroxyl groups with the consequent liberation of water.

The surface-hydroxyl-containing adsorbent solid for use in forming the catalyst is prepared in any manner providing a substantial portion of the effective surface in the hydroxyl form so that there are available hydroxyl groups for reaction with aluminum chloride. It is preferred that at least about 50 percent of the effective surface be in the hydroxyl form. Optimally, nearly all of the effective surface is in the hydroxyl form with no molecular water present.

A suitable method of producing a surface-hydroxyl-containing adsorbent solid is to calcine a silica and/or alumina containing material to produce an adsorbent solid containing at least one of the following adsorbent solid forms: silica gel, chi alumina, eta alumina, gamma alumina, or mixtures thereof such as silica-alumina. Suitable calcination conditions of time and temperature, e.g. a temperature in the range of about 300 to 1100° F. for a time in the range of about 1–24 hours, will produce an adsorbent solid having the required surface area and pore size properties and an LOI less than about 2–4 percent. Water, as liquid or vapor, is then added to the calcined adsorbent solid in the amount of about 1–5 weight percent or more. The added water is permitted to react with the surface of the adsorbent solid to produce surface hydroxyl groups. This hydrated adsorbent solid is then dried under carefully controlled conditions so that molecular water is removed without destroying an appreciable number of the surface hydroxyl groups. Suitable drying conditions are a temperature in the range of about 200–300° F. for a time of about 10–100 hours. Of course, if the adsorbent solid, such as bauxite for example, as received contains 8–10 percent or more of water, as determined by loss on ignition, the hydration step may be omitted.

The catalyst is formed by contacting aluminum chloride with the defined surface-hydroxyl-containing adsorbent solid and causing the aluminum chloride to react with the surface hydroxyl groups on the surface of the defined adsorbent solid, thus forming —O—AlCl₂ groups on the surface. During this reaction one mol of HCl is liberated for each mol of AlCl₃ reacted. HCl is caused to associate, mol for mol with the —O—AlCl₂ groups to form the active catalyst. It is postulated than an —O—AlCl₂ site, when associated with HCl, forms a proton and a negatively charged species, (—O—AlCl₃)⁻, which constitutes the actual catalyst.

The aluminum chloride content corresponding to maximum catalyst activity is that amount of aluminum chloride required to provide a monolayer of reacted aluminum chloride molecules, i.e., reacted with hydroxyl groups to form —O—AlCl₂ groups, over the effective surface area of the defined adsorbent solid. One gram of aluminum chloride will provide a monolayer of aluminum chloride molecules (or —O—AlCl₂ groups) over about 534 square meters of effective surface area.

The preferred method of preparing the catalyst is to form a dry physical mixture of aluminum chloride and surface-hydroxyl-containing adsorbent solid and react the mixture at a temperature in the range of about 0–500° F., preferably about 200–350° F. Normally sufficient pressure is utilized to minimize sublimation of aluminum chloride from the reaction mixture to reduce aluminum chloride loss. A flowing stream of gas may be used as the heat transfer medium for heating the reaction mixture and cooling the reaction products. Hydrogen is a preferred gas, however other relatively unreactive gases such as nitrogen, helium, methane, ethane, propane, butane, etc. may also be used. The reaction time required decreases as the reaction temperature is increased. At the preferred reaction temperature of 200–350° F., a time of about 0.1 to 10 hours is normally sufficient to complete the reaction; however, longer reaction time is not detrimental. HCl is then caused to associate with the reaction product of aluminum chloride and surface-hydroxyl-containing adsorbent solid. This association is carried out at a temperature below about 180–200° F. since at higher temperature the association does not take place.

In fact, a fully formed catalyst will liberate HCl if heated to a temperature of 180–200° F., or higher, even under pressures of 500 p.s.i. or more. The association with HCl is conveniently carried out by contacting the reaction product with anhydrous HCl at a pressure of about 10–500 p.s.i.a. and a temperature in the range of about 60–200° F. One mol of HCl associates for each mol of $AlCl_3$ which has reacted with the surface-hydroxyl-containing adsorbent solid. A time of about 1–100 hours is normally sufficient to complete the HCl association.

The most desirable ratio of aluminum chloride to the defined adsorbent solid depends upon the surface-hydroxyl content of the particular adsorbent solid used. For example, with surface-hydroxyl-containing adsorbent solid particles of about 20–60 mesh size and having an effective surface area of about 230 sq. m./gm., the proportions will normally be about 25–35 weight percent aluminum chloride and about 65–75 weight percent adsorbent solid. Most catalyst forming reaction mixtures comprise 10–50 weight percent aluminum chloride and 50–90 weight percent of the defined adsorbent solid. The catalyst can be prepared in a great number of particle sizes. The final catalyst configuration is determined by the configuration of the surface-hydroxyl-containing adsorbent solid used. The catalyst is hygroscopic, therefore care should be taken to avoid contacting the catalyst with moisture.

ILLUSTRATIONS

An isomerization process uses the above defined solid catalyst in fixed-bed reactors and operates at a temperature in the range of about 50–150° F., and sufficient pressure to maintain a liquid phase in the reactors. The fresh feed, which has been pretreated to reduce sulfur, olefin, and aromatic concentrations to acceptable levels, is fed together with a recycle stream, if desired, to a prefractionator. The prefractionator bottoms contains naphthenes in excess of that amount required as cracking ininhibitor, heavier components from the fresh feed, and a small quantity of high boiling materials from the recycle stream. This bottom stream can be used as catalytic reforming feed or can be blended directly into gasoline. The prefractionator is operated so that the overhead product contains sufficient cycloparaffins to inhibit cracking in the isomerization reactors. The cycloparaffin concentration suitable for inhibiting cracking is in the range of about 3–15 mol percent, preferably 7–15 percent when isomerizing hexanes or mixed pentane-hexane feeds, and about 5–10 percent when isomerizing pentane feed. The cycloparaffins themselves will be isomerized in the process to near-equilibrium composition. Thus, for example, methylcyclopentane can be used as cracking inhibitor and be simultaneously converted to predominately cyclohexane which is also an effective cracking inhibitor.

The prefractionator overhead is cooled and fed to the upper section of a hydrogen scrubber. The purpose of this hydrogen scrubber is to remove hydrocarbons from the recycle regeneration-hydrogen stream described below. The prefractionator overhead is withdrawn from the bottom of the hydrogen scrubber and is fed to the reaction section, which comprises a plurality of fixed bed reactors. If desired, the process stream entering any reactor may be first passed through a bed of solid aluminum chloride ($AlCl_3$ saturator) to replace $AlCl_3$ that may be lost through solubility of this catalytic component in reactor effluent and to make up small sublimation losses which may occur during regeneration.

The reactor effluent is stripped of HCl and then fed to the recycle fractionator, which produces the isomerized product overhead and a recycle stream as bottoms. The HCl from the top of the HCl stripper is recycled to the reaction section.

The fixed-bed reactors are manifolded with valves and piping so that each reactor may be isolated from the process stream for regeneration. The manifolding, which will be described below, and which is exemplified in the drawing, is designed so that each reactor may be located in any position along the process stream.

An aluminum chloride saturator may be used to replace aluminum chloride lost from the catalyst bed during the previous regeneration. This saturator may be located in the feed stream to any reactor in the series; however, the preferred location is in the process stream immediately preceding the freshly regenerated reactor.

Briefly, regeneration comprises isolating a reactor from the process stream, draining the reactor, purging hydrocarbons from the catalyst bed with a flowing stream of hydrogen, heating the catalyst, contacting the hot catalyst with an atmosphere of hydrogen for a time sufficient to increase the isomerization activity of the catalyst, purging the catalyst with a flowing stream of hot hydrogen, cooling the catalyst with a flowing stream of hydrogen purging the hydrogen from the catalyst with gaseous HCl, contacting the catalyst with an atmosphere of gaseous HCl under pressure for a time sufficient to essentially completely react or associate the regenerated catalyst with HCl, depressuring the reactor, filling the reactor with process liquid hydrocarbon, and returning the reactor to process.

In order to minimize the quantity of $C_5$ and heavier hydrocarbons present during regeneration, which would tend to crack and deposit coke on the catalyst during the hydrogen purge and heating steps, a scrubber is provided to scrub these heavier hydrocarbons from the recycle hydrogen stream with reactor charge liquid. This hydrogen scrubber must also be operated under conditions to minimize the hydrogen absorbed in reactor charge because hydrogen tends to inhibit the isomerization reaction. Both of these goals can be accomplished by operating the hydrogen scrubber at low pressure, below about 100 p.s.i., and low temperature, below about 100° F. This hydrogen scrubber may employ any suitable gas-liquid contact means such as Raschig rings, Berl saddles, bubble-cap trays, etc.

Relatively pure HCl is needed during a portion of the regeneration cycle for HCl treating the regenerated catalyst. It can be obtained by using some of the overhead product from the HCl stripper. This lowers slightly the HCl concentration in the on-process reaction liquid; however, after its use in regeneration, the excess HCl is returned to the on-process liquid by absorption in reactor feed which is passing through the hydrogen scrubber into which the HCl is passed following its use during the regeneration cycle. This temporary reduction in the HCl concentration in the process stream has little or no effect on the isomerization conversion provided the HCl concentration is not allowed to decrease below the minimum required to maintain the aluminum chloride-alumina-HCl catalyst species.

Example 1

To illustrate our invention as employed in a process for isomerizing hexanes a test of six months duration will be described. The charge stock for this test had the following composition:

| Component: | Weight percent |
|---|---|
| Neohexane | 0.4 |
| Diisopropyl | 7.8 |
| Methylpentanes | 53.2 |
| n-Hexane | 25.8 |
| Methylcyclopentane | 2.5 |
| Cyclohexane | 10.3 |
| | 100.0 |

This feed material had been previously pretreated to contain aromatic, sulfur and olefin concentrations less than about 10 parts per million parts by weight (p.p.m.), 1 p.p.m. and 50 p.p.m., respectively. The plant utilized four reactors manifolded by appropriate valves and piping so that each reactor could occupy any position from first to last relative to the process stream. The system was similar to that illustrated in the accompanying drawing. The plant was operated with three reactors on stream in series while the catalyst in the fourth reactor was being regenerated. Fractionation equipment was provided to strip HCl from the reactor effluent, to split the product to obtain a high octane neohexane fraction, and to rerun the reactor feed for removal of heavy hydrocarbons. Facilities were provided for recycling HCl and unconverted hexanes. An aluminum chloride saturator was provided to replace slight losses of $AlCl_3$ from the reactor system. This saturator was manifolded with appropriate valves and piping so that it could be located prior to any reactor relative to the process stream or not used at all.

The operating conditions employed for this test are shown below:

| | |
|---|---|
| Space velocity, $w_o/hr./w_c^1$ | 0.15 |
| Reactor average temperature, °F. | 100–115 |
| Saturator temperature, °F. | 115 |
| Reactor pressure, p.s.i.g. | 200 |
| HCl, wt. percent based on feed | 5–7 |
| Cycloparaffin inhibitor, wt. percent on feed | 10–13 |

[1] Weight of oil per hour per weight of catalyst.

The catalyst used was aluminum chloride-alumina prepared as described above from eta phase alumina having a loss-on-ignition at 1832° F. of about 2 wt. percent. This loss on ignition has been found by experience to correspond closely to maximum surface hydroxyl coverage for this alumina. The catalyst as prepared contained about 28 weight percent aluminum chloride.

The steps of the regeneration procedure used were:
(1) Remove reactor from process.
(2) Purge with hydrogen.
(3) Pressure to about 600 p.s.i.g. with hydrogen containing about 2 mol percent of HCl.
(4) Heat catalyst to about 300° F.
(5) Soak in hydrogen containing about 2 mol percent of HCl at about 300° F. for about 30–44 hours.
(6) Cool catalyst to about 125° F. with a flowing stream of hydrogen containing about 2 mol percent of HCl.
(7) Reduce pressure to 200 p.s.i.g. and purge with gaseous HCl.
(8) Soak in gaseous HCl at about 200 p.s.i.g. for about 10–15 hours.
(9) Fill reactor with HCl-saturated feed.
(10) Place reactor on stream.

The catalyst was effectively regenerated during the 30–44 hour hydrogen soak. The 10–15 hour hydrogen chloride treat was used to replace the hydrogen chloride lost from the catalyst during the previous steps of the regeneration procedure. With this regeneration procedure the catalyst activity after regeneration averaged 94 percent of the activity subsequent to the previous regeneration.

The presence of hydrogen in the process stream decreases conversion, 0.15 mol percent hydrogen resulting in a 1 to 2 weight percent decrease in the neohexane content of the product. Therefore, precautions were taken to prevent hydrogen from entering the process stream either through leakage or by way of the hydrogen scrubber.

The test was voluntarily terminated after 4,373 hours of continuous operation during which time neohexane production averaged 40.5 weight percent in the reactor effluent hexanes.

Another test was conducted employing a pentane-hexane feed containing 35 weight percent pentanes. The product pentane fraction contained 81 weight percent isopentane. The conversion of hexanes to neohexane was not affected by the presence of the pentanes in the feed. These data show that our process can be successfully used for mixed pentane-hexane isomerization.

*Example II*

This example shows that greater hydrocarbon conversion activity of a regenerated catalyst of the type described above results when the catalyst regeneration is carried out utilizing the hydrocarbon removal steps of this invention. In this example, clean, substantially pure, hydrogen was used as purge gas to remove hydrocarbon from the catalyst before hydrogen pressure treatment and again before the HCl treat after the hydrogen pressure treatment.

Two catalysts similar to that described in Example I were prepared and used for paraffin isomerization. The catalysts were then regenerated, one according to the present invention and the other without the hydrocarbon removal steps. The conditions used and the results of these tests are shown below:

| | Catalyst A | Catalyst B |
|---|---|---|
| Regeneration Conditions | Drain hydrocarbon. $H_2$ purge, 300° F. $H_2$ treat, 300° F, 575 p.s.i. $H_2$ purge, 300° F. HCl treat, 75° F., 125 p.s.i. 64 hrs. | Drain hydrocarbon. No purge. $H_2$ treat, 300° F, 575 p.s.i. No purge. HCl treat, 75° F., 125 p.s.i. 64 hrs. |

Activity test:

| Days on Oil | Activity | Activity |
|---|---|---|
| 1 | 465 | 390 |
| 2 | 465 | 330 |
| 3 | 320 | 300 |
| 4 | 300 | 200 |

Thus, catalyst A which was regenerated utilizing the hydrocarbon removal steps of the present invention exhibited much better hydrocarbon conversion (isomerization) activity than catalyst B which was regenerated under essentially the same conditions but without the hydrocarbon removal steps.

An illustrative embodiment of our process for isomerizing a mixed hexane feed is shown schematically in the figure. This illustration is a recycle isomerization process for conversion of low octane hexane isomers into dimethyl butane, primarily neohexane (2,2-dimethyl butane), which can be used as a high octane gasoline blending component. The process is also suitable for isomerizing pentanes or mixed pentanes and hexanes. Heptanes may also be present in the feed, however, catalyst life is shortened as the concentration of heptanes in the feed is increased.

Turning now to the figure, charge stock from source 10, has been pretreated to reduce sulfur, olefin, and aromatic concentrations to acceptable levels, is charged via line 11 to prefractionator 12 along with hexane recycle from line 13. A bottoms stream containing naphthenes not required as cracking inhibitor, any heptanes and heavier portion from the fresh feed, and a small quantity of hexanes are withdrawn via valued line 14. This bottoms stream can be reformed or blended directly into gasoline. The prefractionator overhead, which contains most of the hexane isomers and sufficient napthenes to inhibit cracking in the isomerization section, is passed via line 15, through cooler 16 wherein the temperature of the overhead stream is reduced to about 50° F. The cooled feed stream is then passed via line 17 into the upper portion of a hydrogen scrubber 18. The feed stream flows downward through the hydrogen scrubber countercurrently to a rising hydrogen stream, scrubbing from the hydrogen stream any hydrocarbons contained therein which boil above butane. This hydrogen stream is used for regeneration as discussed below. The feed stream passes from the hydrogen scrubber through line 19, is joined by HCl recycle from line 20, and is passed to the reaction section.

For the purpose of illustration, a process employing four reactors is shown and flow through the reaction section will be discussed as though reactor R-4 is being regenerated, reactor R-1 is the next reactor to be regenerated and thus is in the first position, reactor R-2 is the freshly regenerated reactor and thus is in the second position, and as though reactor R-3 was regenerated prior to reactor R-2, following the last regeneration of reactor R-1, and thus reactor R-3 occupies the third and last position in the series of reactors on process. The combined fresh feed-recycle HCl stream is passed into the feed manifold 21, thence through line 22 and valve 23 is open and valves 23a, 23b, 23c, and 23d are closed. The process stream passes upwardly through line 24 to reactor R-1, leaving through lines 24a and 25 into cooler 26 wherein the exothermic heat of reaction is removed. The cooled reactor R-1 effluent then passes into R-1 effluent manifold line 27, thence through valve 28 into aluminum chloride drum inlet line 29. The process stream passes through the aluminum chloride drum 30 into the aluminum chloride drum outlet manifold 31, thence through valve 32a into reactor R-2 inlet line 33 and thence into reactor R-2. Then process stream then flows from reactor R-2 via lines 34 and 35 through cooler 26a into reactor R-2 outlet manifold line 37, valve 38a and reactor R-3 inlet line 39 into reactor R-3. The process stream is passed from reactor R-3 via line 40, and valve 41 into reaction section outlet manifold line 42, thence into HCl stripper 43. HCl is stripped from the reaction section effluent and is recycled via line 20 to reaction section inlet line 21. HCl-free effluent is then passed via valved line 44 into the recycle fractionator 45 from which dimethylbutane product is removed via line 46. The hexane recycle stream removed from the bottom of the recycle fractionator contains diisopropyl, methylpentanes, normal hexane and cycloparaffins as well as a trace of $C_7$-plus material. This bottoms stream is recycled via valved line 13 to prefractionator feed line 11.

Reactor R-4 is isolated from the process stream for regeneration by closed valves 47b, 38b, 48c, 23c, 32c, 50, 51, 51a, 51b, and 51c. Hydrogen from source 52 is introduced to reactor R-4 via valved line 53, line 54, hydrogen inlet manifold 54a, valve 55c and line 56. Hydrocarbon is purged from reactor R-4 through line 57, valve 49b and line 58 into the hydrogen scrubber 18. The hydrocarbon from reactor R-4 joins the feed stream in the hydrogen scrubber 18 and enters the reaction section via lines 19 and 21. Alternatively, a surge drum may be provided into which reactor R-4, or any other reactor may be drained prior to regeneration, and from which the reactor may be refilled prior to being returned to process. The use of such a surge drum will prevent upsetting the operation of the HCl stripper by intermittent variation in load when a reactor is drained or refilled. Scrubbed hydrogen passes from the hydrogen scrubber via line 59 through steam heater 60 and is recycled by a compressor (not shown) into line 54a and into reactor R-4 via valve 55c and line 56. The recycle hydrogen stream is heated by introducing steam from source 61 through valve 62 and line 63 into the steam heater 60. The hot recycle hydrogen stream in turn heats the catalyst in reactor R-4 to the preferred regeneration temperature of about 250–300° F. When the catalyst in reactor R-4 reaches the desired temperature, steam valve 62 is closed and the hydrogen flow is stopped by stopping the recycle compressor and closing valves 55c and 49b. The hot catalyst is allowed to stand in the presence of hydrogen under pressure for a time sufficient to complete regeneration of the catalyst. If desired a small amount of HCl may be present with the hydrogen. Alternatively isobutane from source 68 may be introduced with the hydrogen via valved line 69 and line 54 to aid in removing olefinic contaminants from the catalyst by alkylating them. We have found it best not to include HCl and isobutane simultaneously. The time required for the regeneration is normally in the range of about 6 to 72 hours. After the catalyst regeneration is complete, valves 55c and 49b are again opened, the recycle compressor started and the catalyst cooled to about 100–150° F. by recycling cool hydrogen via lines 59, 54a, 56, 57, and 58. Although not necessary, it is preferred that the recycle hydrogen used for cooling the catalyst contain a small amount of HCl. The HCl can be introduced into the recycle hydrogen stream from HCl storage drum 64 via valved line 65 and line 54 into the hydrogen line 54a. After the catalyst in reactor R-4 is cooled to the desired temperature the reactor is depressured by stopping the recycle hydrogen compressor, closing valve 55c and releasing the hydrogen from the reactor via valve 49b and line 58 into the hydrogen scrubber and then through lines 59, 54a and valve 80 to vent. Valve 66 is then closed and the reactor is pressured to about 150–250 p.s.i. with HCl from recycle line 20 via valved line 67. The catalyst in reactor R-4 is allowed to stand in the presence of HCl under pressure for a time sufficient to react essentially completely the aluminum chloride-alumina catalyst with HCl. A time of 5–15 hours, more or less, is normally sufficient to complete this reaction. When the HCl reaction is completed, valved line 67 is closed and the reactor is again depressured via line 57 valve 49b and line 58 into hydrogen scrubber 18 where the HCl is absorbed in reaction section feed. Valve 49b is then closed and the reactor R-4 is then filled with liquid by opening valves 48c and 50.

When the reactor is filled with liquid, valves 48c and 50 are closed and then R-4 is put on stream in the second position preceded by the saturator, R-3 is moved to the first position, R-2 is changed to the last position and R-1 is removed for regeneration by opening valves 23b, 48b, 51a, 32c, and 70, and closing valves 23, 28, 32a, 38a and 41. Feed then flows from the bottom of the hydrogen scrubber 18 via lines 19 and 21 into reactor R-3 via valve 23b and line 39. The process stream then is passed via lines 40 and 72, valve 48b and line 29 into the AlCl drum 30, thence via line 31, valve 32c and line 57 into reactor R-4, thence from reactor R-4 via lines 56 and 74 through cooler 26c into reactor R-2 via line 75, valve 51a and line 33. Effluent from R-2 flows via line 34, valve 70 and line 42 into the HCl stripper 43. Reactor R-1 is thus isolated from the process stream by closed valves 38, 48, 51, 76, 23, 32, 71, 55, 47, 47a, 47b, and 28. Reactor R-1 is then regenerated.

As has been pointed out above, HCl is released from the catalyst during the heating step of the regeneration sequence. If it is desired to prevent the HCl concentration from building up excessively in the process stream during the time a reactor is undergoing hydrogen treatment, HCl may be withdrawn from the system via valved line 77 into HCl storage drum 64. Make-up HCl is added to HCl storage drum 64 via valved line 78. If contaminants build up excessively in the HCl recycle stream, a portion of this stream can be purged from the system via valved line 79. Likewise hydrogen can be purged from the system via valved line 80.

While our invention has been described herein as in a particular isomerization process, it is to be understood that other processes may employ our invention advantageously. While our invention has been described herein as applying to regeneration of a particular reactor and to a process employing a particular number of reactors, it should be understood that it is equally applicable to regeneration of any one or more reactors and to a process employing any number of reactors. While our invention has been described as applied to a particular isomerization process system, various alternative processing arrangements and operating conditions will be apparent from the above description to those skilled in the art.

Having thus described our invention, we claim:

1. A method of regenerating a used paraffin isomerization catalyst consisting essentially of the reaction product of aluminum chloride and hydroxyl groups of surfacehydroxyl-containing adsorbent solid to provide a regenerated catalyst having substantially greater catalytic activity for isomerization than said used catalyst, which method comprises the steps of (1) removing hydrocarbon boiling above butane from the catalyst by purging said catalyst with a gas inert thereto, (2) treating the catalyst from step (1) with hydrogen gas containing 0 to 5 mol percent of HCl at elevated temperature and pressure for a time of at least about one hour, (3) purging the catalyst from step (2) with gaseous HCl to remove volatile hydrocarbon therefrom, and (4) treating the catalyst from step (3) with HCl at elevated pressure and a temperature in the range of about 0 to about 200° F.

2. The method of claim 1 wherein the total time for effecting step (3) and (4) is in the range of about 1 to about 100 hours.

3. The method of claim 1 wherein the time for effecting step (4) is about 5 to about 25 hours and the pressure is in the range of about 25 to about 250 p.s.i.

4. In a process for regenerating a used hydrocarbon conversion catalyst consisting essentially of aluminum chloride reacted with hydroxyl groups of surface-hydroxyl-containing adsorbent solid to provide substantially greater hydrocarbon conversion activity than said used catalyst, which process includes the sequential steps of treating the catalyst with hydrogen gas at a temperature of from about 100 to about 400° F. and a pressure of from about 50 to about 2500 p.s.i. for a time of about 1 to about 100 hours, and treating the catalyst with gaseous HCl at a temperature in the range of about 0 to about 200° F. and a pressure in the range of about 25 to about 250 p.s.i. prior to resuming hydrocarbon conversion in the presence of the catalyst, the improvement which comprises removing volatile hydrocarbon from the catalyst both prior to said treating with hydrogen gas and subsequent to said treating with hydrogen gas treating with gaseous HCl.

5. The improvement of claim 4 wherein said removing of volatile hydrocarbon is effected by purging with hydrogen gas, which gas is substantially free of hydrocarbons having a boiling point higher than butane.

6. The improvement of claim 4 wherein said removing of volatile hydrocarbons is effected by purging with gaseous HCl.

References Cited by the Examiner

UNITED STATES PATENTS

| | | | |
|---|---|---|---|
| 2,904,519 | 9/1959 | Cornfield et al. | 252—420 |
| 3,210,292 | 10/1965 | Evans et al. | 252—411 |

OSCAR R. VERTIZ, *Primary Examiner.*

A. J. GREIF, *Assistant Examiner.*